United States Patent
Rampal

[19]

[11] Patent Number: 6,102,659

[45] Date of Patent: Aug. 15, 2000

[54] SWASH-PLATE DEVICE FOR CONTROLLING THE PITCH OF ROTOR BLADES WITH CYLINDRICAL RUNNERS SLIDING ON NON-ROTATING PILLARS

[75] Inventor: Etienne Rampal, Marseilles, France

[73] Assignee: Eurocopter, France

[21] Appl. No.: 09/199,238

[22] Filed: Nov. 24, 1998

[30] Foreign Application Priority Data

Nov. 28, 1997 [FR] France ................................. 97 15018

[51] Int. Cl.[7] .............................................. B64C 27/605
[52] U.S. Cl. ................. 416/114; 416/115; 416/134 A; 416/141
[58] Field of Search .................... 416/114, 115, 416/134 A, 141, 170 R

[56] References Cited

U.S. PATENT DOCUMENTS

| | | | |
|---|---|---|---|
| 3,602,059 | 8/1971 | Jupe . | |
| 3,734,644 | 5/1973 | Garcia | 416/114 |
| 4,375,940 | 3/1983 | Lovera et al. | 416/114 |
| 5,624,232 | 4/1997 | Certain | 416/114 |
| 6,033,182 | 3/2000 | Rampal | 416/114 |

FOREIGN PATENT DOCUMENTS

| | | |
|---|---|---|
| 318 398 | 10/1974 | Austria . |
| 1 294 221 | 5/1965 | Germany . |
| 36 03 400 | 5/1987 | Germany . |
| 36 20 794 | 12/1987 | Germany . |

*Primary Examiner*—Edward K. Look
*Assistant Examiner*—Richard Woo
*Attorney, Agent, or Firm*—Piper Marbury Rudnick & Wolfe

[57] ABSTRACT

The rotating and non-rotating swash-plates are guided in axial translation and in tilting on the rotor axis by two non-rotating pillars and slides provided with runners with a cylindrical external face permanently tangentially engaged and sliding against the internal faces of the pillars, the slides bearing two diametrically opposite trunnions allowing the pivoting of the non-rotating plate around a diametrical axis, whereas the sliding and pivoting of the runners on the pillars guide the pivoting of the non-rotating plate around a second diametrical axis, which is the axis of the cylindrical face of the runners.

22 Claims, 5 Drawing Sheets

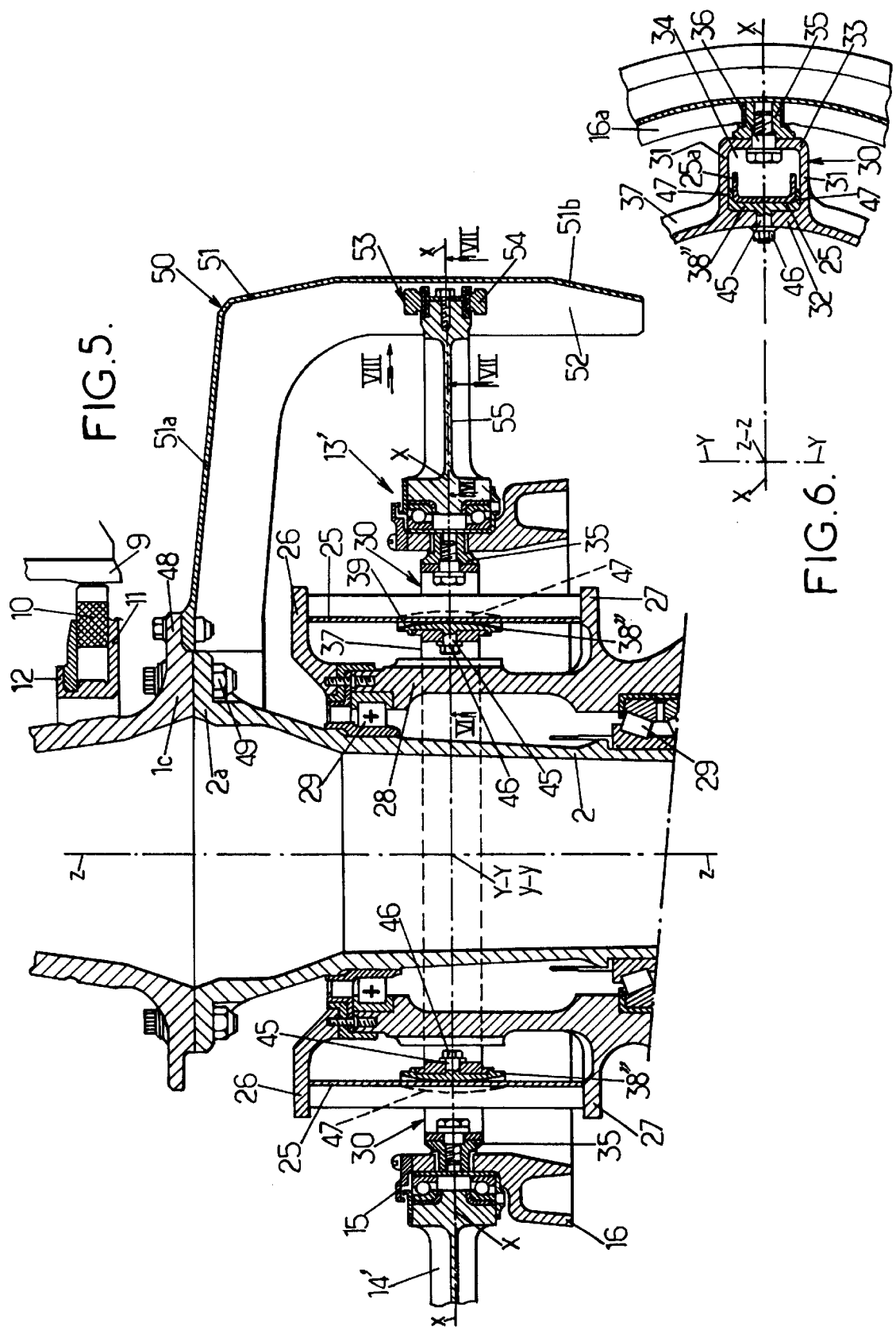

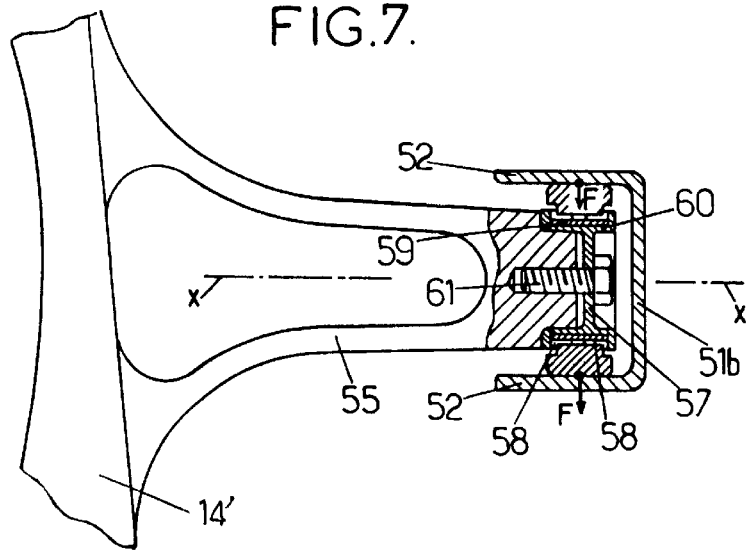
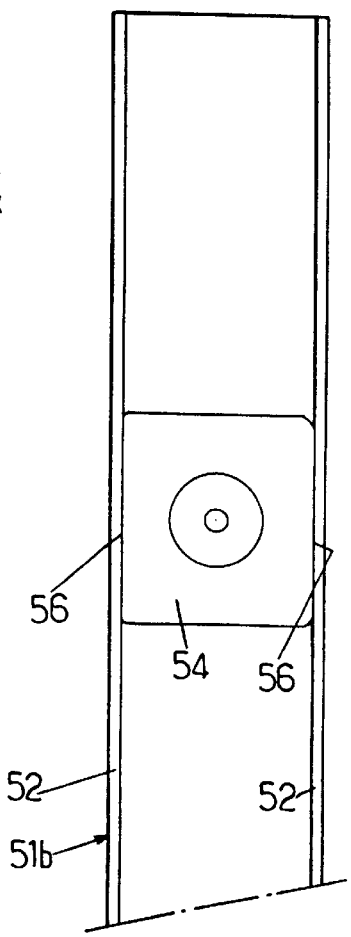

SWASH-PLATE DEVICE FOR CONTROLLING THE PITCH OF ROTOR BLADES WITH CYLINDRICAL RUNNERS SLIDING ON NON-ROTATING PILLARS

BACKGROUND OF THE INVENTION

The invention concerns devices for controlling the pitch of rotor aircraft rotor blades, particularly a helicopter main rotor, the rotor being of the type for which each blade is, on the one hand, rotated around an axis of rotation of a rotor shaft, or rotor axis by means of a hub rotating integrally with the shaft, and, on the other hand, rotating integrally, around a longitudinal blade pitch change axis, with at least one pitch lever controlled by a corresponding pitch rod.

The invention relates more exactly to a pitch control device of the type including a swash-plate assembly, and such that each pitch rod is connected to a plate rotating with the rotor and belonging to the swash-plate assembly, in which the rotating plate is mounted to rotate on a non-rotating plate, restrained against any rotation around the rotor axis, the two plates being annular, centered on the rotor axis and surrounding this axis and being able to be translated axially, i.e. parallel to the rotor axis, and tilted in any direction around the rotor axis, being activated by control actuators connecting the non-rotating plate to the rotor aircraft structure for the control of the collective pitch and the cyclic pitch respectively of the blades.

The control device of the invention is in particular of the type in which, moreover, the non-rotating plate is restrained against rotation by means of two non-rotating pillars around the rotor axis, which are parallel to said rotor axis, diametrically opposite in relation to this axis, and connected to the structure, and which guide the plates in translation along the rotor axis by means of two movable slides each along a respective pillar and belonging to an articulated connection which connects the non-rotating plate to the pillars and allows the plates to be tilted in any direction around the rotor axis by pivoting of the non-rotating plate around two diametrical axes of the latter, which are perpendicular to each other and one of which remains perpendicular to the rotor axis, each of the two slides cooperating with one of two coaxial trunnions respectively around a first of the two pivoting diametrical axes.

Such a pitch control device, known generally via DE-A-36 20 794, enables the height of a rotor shaft-hub assembly and swash-plate device to be reduced in comparison with conventional embodiments, in which the swash-plates are able to be translated axially and to be tilted by an axial translation and tilting guidance mechanism which includes a central ball joint, centered on the rotor axis, and on which the non-rotating plate, and therefore the swash-plates, are oscillating mounted, the ball joint being itself mounted sliding axially (parallel to the rotor axis) around a cylindrical guide coaxial to the rotor axis and not rotating around this rotor axis, and generally fixed in relation to the rotor aircraft structure. When the swash-plates surround the rotor shaft, which is most often the case, the cylindrical guide is tubular, surrounds the rotor shaft, and is fixed to a housing integral with the structure of the rotor aircraft and surrounding the connection between the rotor shaft base and the main transmission box.

In these conventional embodiments, one or more rotating and upper or non-rotating and lower connection unit or units, which respectively connect the rotor to the rotating plate to rotate the latter, and the structure to the non-rotating plate, to restrain the latter from any rotation around the rotor axis, is or are one or more scissor-articulated torque links with two arms connected to each other by a pivot or a hinge, which enables the two arms of each torque link to move apart or draw together in order to enable movements in the direction of the rotor axis, since the upper and lower arms of a rotating torque link are moreover articulated on the shaft or the hub of the rotor and on the rotating plate respectively, and since the lower and upper arms of a non-rotating torque link are moreover articulated on the structure of the rotor aircraft and on the non-rotating plate.

The drawbacks of these rotating and non-rotating torque links are that their articulations comprise traditional, unreliable, bearings, or, on more recent helicopters, ball joints and self-lubricating bearings including numerous carbide pins and rings, which are heavy and expensive.

Furthermore, a certain overall height or axial requirement (parallel to the rotor axis) and requirement in width is necessary for the torque links to operate correctly. So, to facilitate their loading for example in the hold of a transport aircraft and to improve their capacity to be accommodated in a hangar, for example of a ship, modern helicopters must offer the best possible vertical or axial compactness of the shaft and the main rotor assembly and of the swash-plate assembly which surrounds it. But reduction in the height or axial size of such an assembly is limited by the interference between the two arms of a torque link during folding of the latter and by the maximum swiveling angles permitted by the construction of the articulation joints of the torque links.

The axial space requirement of a swash-plate control device with torque links being mainly determined by the clearance of the torque links, on account of the folding and swiveling angles necessary for their operation, a proposal has already been made, in order to reduce the height of such an assembly, to eliminate either the rotating torque link or links, or the non-rotating torque link or links, and to use two guide pillars, parallel to each other and to the rotor axis and on either side of this axis in the same radial plane passing through the rotor axis, of a guidance mechanism for the axial translation and tilting of the swash-plates which also includes a cardan joint connection, with an intermediate ring mounted sliding axially by means of the pillars, and articulated pivoting on these pillars around a diametrical axis of the ring, which is an axis remaining perpendicular to the rotor axis, whereas the ring is articulated pivoting on one of the swash-plates around another diametrical axis of the ring, which is perpendicular to the first diametrical axis, as proposed in DE-A-36 03 400 and DE-A-36 20 794. Thus, axial movements of the swash-plates and of the ring are guided by the two pillars, whereas tilting movements of the swash-plates in any direction around the rotor axis are obtained by pivoting the swash-plates in relation to the ring around one of two diametrical and perpendicular axes of the ring, and by pivoting the ring on the pillars around the other of these two perpendicular diametrical axes.

The guide pillars can be rotating (rotating integrally with the rotor), and so too can the ring mounted in this case between the rotating pillars, on the one hand, and, on the other hand, the rotating plate thus rotated by the pillars and the ring which replace the rotating torque link or links. But the guide pillars can also be non-rotating, i.e. restrained against any rotation around the rotor axis by a support fixed to the structure of the rotor aircraft, in which case the ring is also non-rotating and mounted between, on the one hand, the non-rotating pillars, and, on the other hand, the non-rotating plate, thus restrained from rotating by the non-rotating pillars and the non-rotating ring, which replace the non-rotating torque link or links.

If the pillar and cardan ring devices have the advantage of providing a saving in overall height (axial) requirement compared with torque link devices, pillar devices do nonetheless have the drawbacks of a greater transverse space requirement, due to the greater diameter of the swash-plate assembly in order to house the intermediate ring between the swash-plates and the pillars, and low resistance and poor control of vibration, which leads to the use of rotating pillars being avoided. Lastly, the use of rotating or non-rotating guide pillars does not prevent the simultaneous use of one or more respectively non-rotating or rotating torque links, since a device comprising both non-rotating pillars and rotating pillars must be ruled out, in so far as it does not allow all the tilting movements required by the cyclic pitch controls and provided by the cardan ring.

Furthermore, in the device with non-rotating pillars of DE-A-36 20 794, each of the two slides is arranged as a crosspiece, one branch of which slides axially without notable play and the other branch of which constitutes the trunnion allowing the pivoting, by one of two diametrically opposite bearings, of the cardan ring on the pillars around a diametrical axis of the non-rotating plate, the ring being itself pivoting on the non-rotating plate, around the other diametrical and perpendicular axis, by two ball joints in two other diametrically opposite bearings.

The problem at the basis of the invention is to improve a swash-plate device for controlling pitch which comprises non-rotating pillars for restraining rotation of the non-rotating plate, so that it does not comprise two pairs of articulations with bearings diametrically opposite two by two, nor crosspieces, which are fragile components, expensive and difficult to manufacture, assemble and maintain, to allow translation and tilting movements of the rotating plates.

SUMMARY OF THE INVENTION

One object of the invention is to propose a pitch control device in which the non-rotating torque link or links and the sliding central ball joint of conventional devices are replaced by non-rotating pillars engaging with more straightforward and plainer articulation means, which are better suited to the various demands of practice than those proposed by DE-A-36 20 794.

To this end, the pitch control device of the invention, of the type presented above, is characterized in that each of the slides is, on the one hand, mounted pivoting on the non-rotating plate by the corresponding trunnion swiveling in one of two radial, coaxial and diametrically opposite bores respectively, and, on the other hand, integral with one of two runners respectively diametrically opposite in relation to the center of the non-rotating plate on the rotor axis and each having an external face, in relation to the rotor axis, which is a cylindrical surface portion the axis of which is the second pivoting axis, perpendicular to the rotor axis, and with the result that the runners are permanently engaged sliding by their external surface with the pillars and between them, translating and/or tilting with the slides in relation to the pillars, by rotation around the second pivoting axis.

In this way a device is obtained which retains the advantages of known devices with non-rotating pillars compared with devices with non-rotating torque links and sliding central ball joint, without having the drawbacks associated with pairs of articulations diametrically opposite two by two and with crosspieces of these known devices with non-rotating pillars.

In particular, the presence, on the slides, of the two runners with cylindrical external shape kept tangentially engaged sliding against the pillars by their coaxial external surfaces around the second pivoting axis of the swash plates and also, preferably, of the two trunnions defining the first of the two pivoting axes of the swash-plates, enables simply and plainly the crosspieces and the two other articulations, for example, with ball joint, of prior art embodiments to be replaced.

Moreover, it is not indispensable for an intermediate cardan ring to be provided between the non-rotating plate and the crosspieces of the pillars, as is necessary in prior art embodiments, if each of the slides of the device of the invention is mounted so as to be restrained swiveling on the non-rotating plate by the corresponding trunnion.

However, to avoid the over-sizing which is then necessary on account of the assembly of the slides and the runners being cantilevered mounted by the corresponding trunnions inwardly of the non-rotating plate, it is to advantage for the two slides to be integral with a same rigid ring non-rotating around the rotor axis and surrounding said axis, and on which ring the slides are diametrically opposite, with the result that the ring is pivoted around the first and/or the second pivoting axis and/or translated with the slides.

In this way, in the event of variation in collective pitch, the two slides are translated with the non-rotating plate and by the control actuators along the rotor axis, if need be with the ring, and the two runners slide along the pillars without rotating around the axis of their cylindrical surface and without tilting on the two pillars, by moving parallel to the latter. In the event of variation in the cyclic pitch, the two slides rotate, if need be with the ring, in relation to the non-rotating plate around the axis of the trunnions, and/or in relation to the pillars, by the runners sliding and pivoting around the axis of their cylindrical surface, being activated by control actuators controlling the non-rotating plate.

When the two swash-plates surround the rotor shaft, as is generally the case, the two non-rotating pillars are, in the known way, fixed to the structure by means of fixing supports to a tubular housing, which is fixed to said structure and surrounds the base of the rotor shaft, being itself surrounded by the ring integral with the slides and runners.

To ensure an effective rotation lock of the non-rotating plate, by means of the trunnions, slides and non-rotating pillars, it is to advantage for one at least of the two engaging elements that are a pillar and a slide to have two substantially radial sides in relation to the rotor axis and between which the other element is restrained from rotation around said axis, with play in the radial direction in relation to the rotor axis which is sufficient to enable the sliding with rotation of the corresponding runner and of the slide against the corresponding pillar. Moreover, to prevent any rotation of the slide around the first pivoting axis of the plates, said other element is to advantage sliding fit mounted between said substantially radial sides of the first element considered.

In an embodiment which is to advantage simple, robust and cost effective, each slide includes a clevis with two substantially radial sides outwards from a clevis bottom with which the corresponding runner is integral, so that the cylindrical external face of the runner delimits the internal radial wall, in relation to the rotor axis, of a central clevis passage which is traversed by the corresponding pillar.

Each runner may be of one piece with the corresponding slide, in which case the cylindrical external face of the runner is to advantage manufactured on the slide, but it is also possible for each runner to be added to the corresponding slide.

In this case, each runner may include to advantage at least one tab projecting radially inwards, in relation to the rotor axis, and by which the runner is fixed, preferably by screwing, on the corresponding clevis bottom. Attachment of the runner may in particular be provided against the external radial face of the corresponding clevis bottom.

Whether the runner is added to the slide or of one piece with it, it is additionally to advantage, so as to facilitate axial guiding on the pillars and the rotary mounting on the non-rotating plate, as well as to improve the rigidity of the slides, for the central passage of each clevis to be delimited radially outwards, in relation to the rotor axis, by an external wall of the slide, and for the corresponding trunnion to be restrained projecting outwards on said external wall of the slide. In this case, it is to advantage for each trunnion to be fixed on said external wall by a screw with the head restrained in the central passage of the clevis and against this external wall, and with the shank having a threaded end screwed in a trunnion bore, and an intermediate and smooth shank part, traversing said external wall, for the passage of stresses through this smooth shank part, and not through the pitch of the threaded part.

In an advantageous embodiment, where each runner is added in the clevis of the corresponding slide, each runner has a "U" shaped cross section and has two outwardly substantially radial sides, on the sides of its cylindrical external face, and between which the corresponding pillar is engaged with a sliding fit, the sides of each runner being between and against the sides of the clevis of the corresponding slide.

But, whether the runner is added or of one piece with the slide, the engagement of each pillar with the corresponding slide with runner is further improved if, in addition, each pillar also has a "U" shaped cross section, open radially outwards, with two substantially radial flanges engaged with sliding fit between the two sides of the clevis or of the corresponding runner.

The rotating plate may be rotated with the rotor in the conventional manner, by means of at least one rotating torque link, with at least two arms articulated on each other and one of which is articulated on the rotating plate and the other articulated on the shaft and/or the hub of the rotor.

But, if further reduction is required in the vertical or axial space requirement of the pitch control device and of the rotor head on which the device is mounted, the rotating toque link or links is or are eliminated, and the rotating plate is to advantage rotated with the rotor by means of a driver, such as described in U.S. application Ser. No. 09/157,817 filed Sep. 21, 1998, to which reference will be made for more details.

Suffice it is to recall that such a rotating plate driver includes two rigid rotation drive tracks extending at least partly substantially axially, parallel to the rotor axis, diametrically opposite in relation to the rotor axis and rotating integrally with one at least of the two components namely the hub and the rotor shaft, each track engaging with one of two drive pins respectively, rotating integrally with the rotating plate and diametrically opposite on the latter, one of the two engaging elements namely a track and a pin having two flanges between which the other element is engaged, so that each drive pin follows on the corresponding track a rectilinear trajectory, parallel to the rotor axis, in the case of variation in collective pitch, and a circular arc trajectory centered on the rotor axis, in the case of variation in cyclic pitch.

As described in U.S. application Ser. No. 09/157,817 filed Sep. 21, 1998, each drive track is delimited to advantage in a substantially axial groove of the driver, and the corresponding pin is engaged in the groove. In order to have good resistance to fatigue and good flexural and torsional rigidity, each groove may be formed in a substantially axial part with a "U" shaped cross section of one of two rigid driver arms respectively, and the corresponding pin is engaged between the two flanges of the "U" shaped groove of said arm, and to limit the transverse space requirement and the drag of the device, the "U" shaped groove is open radially towards the rotor axis, and each pin projects outwards from the rotating plate, radially in relation to the center of said rotating plate.

To take account of the fact that rotation drive stresses may be unbalanced and alternate on the two flanges of the "U" shaped groove of an arm, in particular during variations in collective and cyclic pitch, one at least of the pins includes to advantage at least one runner and/or at least one roller sliding and/or rolling respectively against one at least of the two flanges of the "U" shaped groove delimiting the corresponding drive track.

When said pin includes a runner, the runner is to advantage articulated in relation to the rotating plate, at least in rotation around an axis passing through the center of the rotating plate, on the rotor axis, and, in a preferred embodiment, the runner has two opposite side faces substantially plane and parallel to the flanges of the "U" shaped groove in which the runner slides, and the runner is mounted rotary and sliding around a runner support hub which is fixed on the external radial end of a pin-support arm of the rotating plate.

As a variant, the pins may each comprise one of two coaxial rollers respectively, mounted diametrically opposite on the rotating plate and rolling around their common axis.

BRIEF DESCRIPTION OF THE DRAWING

Other advantages and characteristics of the invention will emerge from the description given below, in a non-restrictive way, of examples described by reference to the appended drawings in which:

FIG. 5 is a similar view to FIG. 1 of a rotor equipped with a second variant of the second example of a pitch control device in accordance with the invention, FIG. 6 is a partial sectional view along VI—VI of the pitch control device in FIG. 5, FIG. 7 is a sectional view, along VII—VII of the device in FIG. 5, and FIG. 8 is a view along the arrow VIII of FIG. 5.

DESCRIPTION OF THE PREFERRED EMBODIMENT

Figure 1:
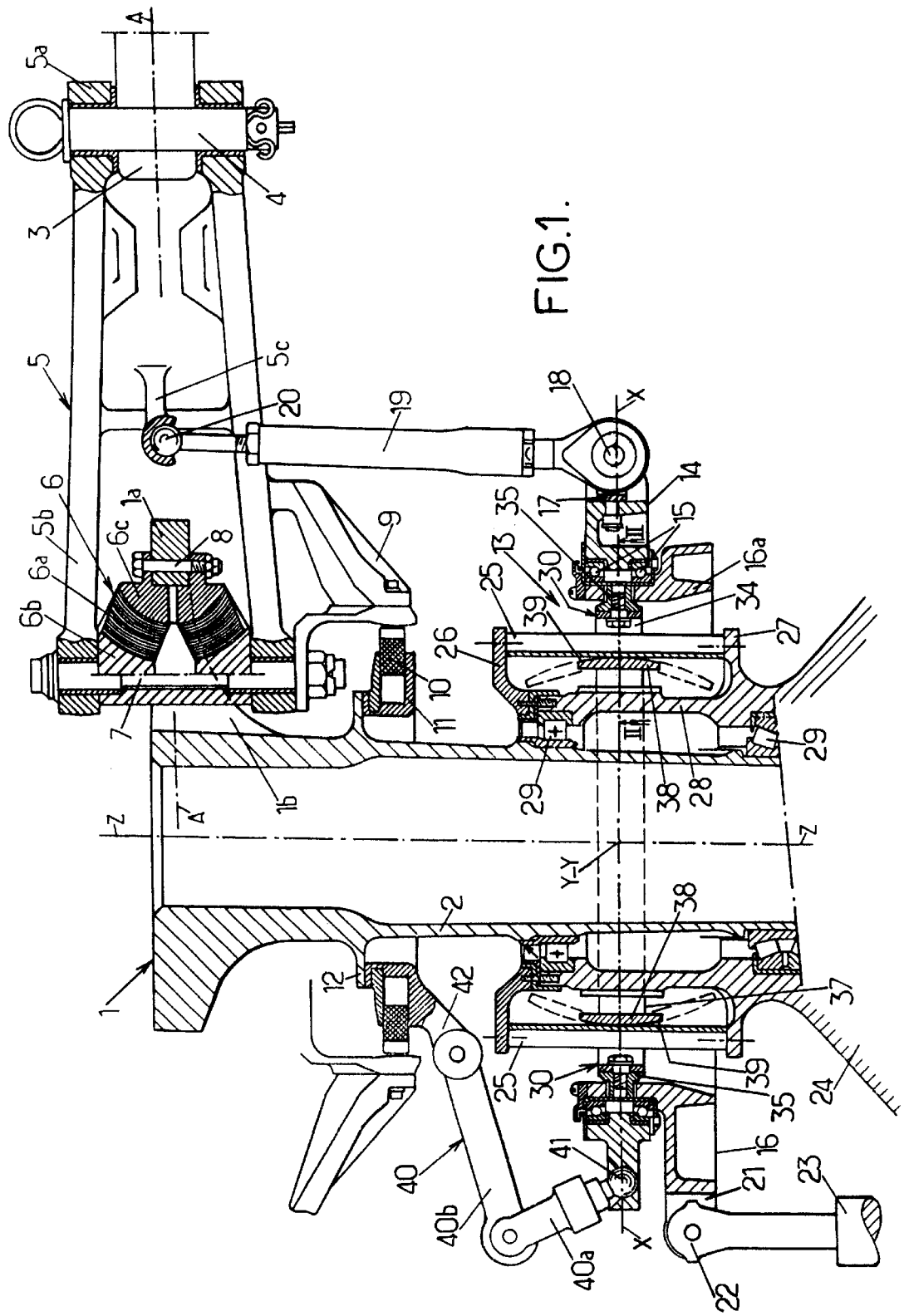
FIG. 1 is a diagrammatic and partial sectional view passing through the rotation axis of a helicopter main rotor equipped with an example of a pitch control device in accordance with the invention.

In FIG. 1, the helicopter main rotor shown has a known structure it includes essentially a hub 1 integral with the upper end of a tubular rotor shaft 2, rotated by its base around its axis Z—Z, which is the axis of rotation of the rotor. Each rotor blade 3 (only one of which is partly shown in FIG. 1) is restrained by its root, and by means of two transverse pins such as 4, in an external radial clevis 5a of a component 5 connecting the blade 3 to the hub 1. The component 5, henceforward called a sleeve in the rest of the description, has an internal radial clevis 5b by which the sleeve 5 is connected to the hub 1 by restraining and articulation means 6, which restrain the sleeve 5 and the blade 3 against centrifugal forces, when the rotor rotates, and enable angular clearances of the sleeve 5 and of the blade 3 in pitch, around a longitudinal pitch change axis A—A, substantially radial in relation to the rotor axis Z—Z, and in flapping and in drag, in the known way.

In this example, the restraining and articulation means 6 include a spherical laminated bearing of known structure, with a laminated central part 6a, constituted by an alternate stacking of rigid cups and layers of elastomer in the shape of spherical caps centered substantially in the external radial edge 1a of a corresponding recess 1b of the hub 1, which is of the type with a dimpled radial plate, comprising as many axial recesses 1b as the rotor comprises blades 3. On either side of its central part 6a, the spherical laminated bearing 6, housed in the corresponding recess 1b, includes an internal radial frame 6b, mounted as a spacer between the branches of the internal clevis 5b of the sleeve 5 by threaded pins such as 7, and an external radial frame 6c fixed by screw-nut assemblies such as 8 on the external radial edge 1a of the corresponding recess 1b. The spherical laminated bearing 6 is thus connected to the hub 1 by its external frame 6c and to the sleeve 5 by its internal frame 6b.

For each blade 3, a low anti-flapping restrainer 9, fixed under the internal clevis 5b of the sleeve 5, engages with a droop restraining ring 10, of known structure, mounted sliding radially around the shaft 2 in a guidance ring 11 fixed, for example by bolting, to an external radial flange ring 12 of the shaft 2.

The shaft 2 is surrounded by a swash-plate assembly 13 of a pitch control device of blades 3, the sleeve 5 of each of which is equipped, to this end, with a pitch lever 5c projecting laterally from the sleeve 5, for example towards the leading edge of the corresponding blade 3.

The swash-plate assembly 13 includes two annular plates, surrounding the rotor shaft 2, and one of which is a rotating plate 14 mounted in rotation by means of two ball bearings 15 around the central part 16a of the other plate 16 which is a non-rotating plate. External radial clevises 17, equal in number to the blades 3, are evenly distributed over the external periphery of the rotating plate 14, and in each clevis 17 is restrained a ball joint 18 articulating, on the rotating plate 14, the lower end of a pitch control rod 19, the upper end of which is articulated, also by a ball joint 20, in an end clevis of the pitch lever 5c of a corresponding blade 3. Under the rotating plate 14, the non-rotating plate 16 has three external radial clevises 21, one of which is for example directed towards the back of the helicopter and each of the two others laterally towards one of the two sides respectively of the helicopter, and in each of which is restrained a ball joint 22 articulating, on the non-rotating plate 16, the upper end of one of three control actuators 23, for example double acting linear servo jacks, respectively, the lower end of each of which is articulated, also by a ball joint (not shown) in a clevis of the structure of the helicopter, for example on the conical housing 24, which is fixed to the structure of the helicopter and surrounds the connection of the base of the rotor shaft 2 to the outlet of the main gear box, for driving the rotation of the shaft 2.

The two coaxial plates 14 and 16 may be translated axially, parallel to the rotor axis Z—Z, and tilted in any direction around this axis Z—Z by an axial translation and tilting guidance mechanism according to the invention, which maintains the plates 14 and 16 centered on the rotor axis Z—Z.

This guidance mechanism includes two fixed axial guide pillars and a non-rotating ring with two slides in clevises passed through by the pillars and mounted pivoting, on the one hand, on the non-rotating plate 16, around a first diametrical axis X—X of this plate 16, and, on the other hand, in relation to the pillars around a second diametrical axis Y—Y of the non-rotating plate 16, perpendicular to the first diametrical axis X—X and to the rotor axis Z—Z.

More exactly, two pillars 25 parallel to each other and to the rotor axis Z—Z and diametrically opposite in relation to this axis Z—Z, i.e. symmetrical with each other in relation to the axis Z—Z, are fixed to the structure of the helicopter, being restrained by their upper and lower ends, for example, by screwing, on upper 26 and lower 27 fixing tabs of a tubular support 28, coaxial to the shaft 2 guided in rotation in the support 28 by the bearings 29 positioned and restrained by the support 28, which is integral with the upper end of the conical housing 24. The upper fixing tabs 26 are added by screwing on the support 28 to facilitate the assembly of the pillars 25 and the assembly and restraint in the support 28 of the upper bearing 29 and an associated seal, whereas the lower fixing tabs 27 are radial and of one piece with the support 28 and the conical housing 24.

Around each pillar 25 is sliding mounted one of two slides 30 respectively, each in the form of a closed clevis, comprising two parallel sides 31, projecting substantially radially outwards (in relation to the axis Z—Z) from a clevis bottom 32, and connected to each other by a wall 33 in an external radial position. Each slide 30 thus has a central passage 34 passed through, with radial play (in relation to the axis Z—Z) explained below, by a pillar 25, and one of two cylindrical, coaxial trunnions 35 respectively, projecting radially outwards from the external walls 33 of the clevises 30.

Figure 2:
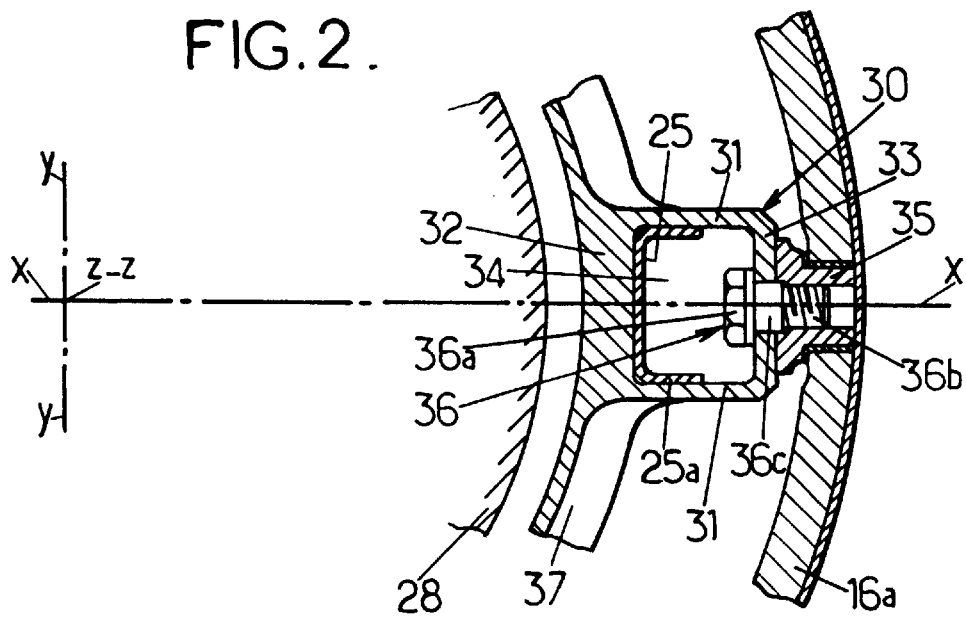
FIG. 2 is a partial view, sectional along II—II in FIG. 1.
Figure 3:
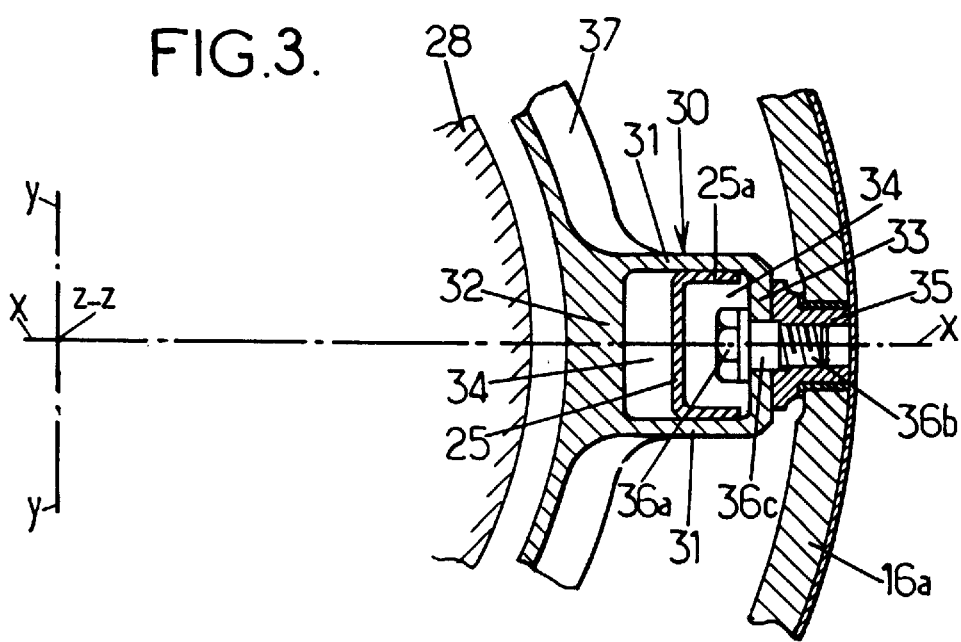
FIG. 3 is a similar view to FIG. 2 in another relative position of elements of the device in FIG. 1.

As can also be seen in FIGS. 2 and 3, each trunnion 35 is fixed by a widened base against the external radial face of the external wall 33 of the corresponding clevis 30 by a screw 36, with a head 36a housed in the central passage 34 and against the wall 33, and with a shank with a threaded end 36b screwed into a tapped bore of the trunnion 35 and with a smooth intermediate part 36c passing through the wall 33 to receive stresses, which are thus not applied to the threaded end 36b. The two clevises 30 are of one piece with a rigid ring 37, on which the clevises 30 are diametrically opposite, and which is mounted around the support 28 and between this support 28 and the pillars 25, each one of which has a "U" shaped cross section open radially outwards (in relation to the axis Z—Z) with two radial flanges 25a mounted with sliding fit between and against the sides 31 of the corresponding clevis 30.

The ring 37 thus has the two clevises 30 diametrically opposite, which support the two diametrically opposite and coaxial trunnions 35 each of which is mounted swiveling in one of two cylindrical and radial bores respectively, arranged in diametrically opposite positions in the central part 16a of the non-rotating plate 16, so as to emerge in the internal radial face of this plate 16 and to be coaxial around a same diametrical axis X—X of the non-rotating plate 16.

The two plates 14 and 16 can thus pivot around the axis X—X in relation to the ring 37 and to the clevises 30.

Each one of the two clevises 30 also supports, on its devis bottom 32, one of two runners 38 respectively diametrically opposite in relation to the center of the non-rotating plate 16 and the ring 37, and integral with the clevises 30 and the ring 37. These two runners 38, placed between the two pillars 25, each extend projecting above and below the corresponding clevis bottom 32, i.e. towards the upper 26 and lower 27 fixing tabs of the corresponding pillar 25. Each runner 38 has a face 39 in external radial position (still in relation to the axis Z—Z), which is one of two diametrically opposite portions of a same cylindrical surface the axis Y—Y of which is a diametrical axis of the non-rotating plate 16 which cuts the rotor axis Z—Z by being perpendicular to this axis Z—Z and to the other diametrical axis X—X defined by the trunnions 35 (see also FIG. 2). Each runner 38 thus has a cylindrical external face 39, which delimits the wall in an internal radial position of the central passage 34 of the corresponding clevis 30, and by this cylindrical external face 39, each runner 38 remains permanently engaged tangentially and sliding against the internal face (in relation to the axis Z—Z) of the corresponding pillar 25.

In this example, each runner 36 is of one piece with the ring 37 and the corresponding clevis bottom 32, and its cylindrical external face 39 is machined on this single part.

The two runners 38 thus constitute substantially two diametrically opposite sectors of a same cylindrical wheel of Y—Y axis, being able, on the one hand, to rotate with the ring 37 and the clevises 30 around its axis Y—Y, and, on the other hand, to translate parallel to the axis Z—Z with the ring 37 and the clevises 30, by sliding tangentially against the pillars 25 and between them, and respectively by tilting in relation to the pillars 25 and by translating along the pillars 25.

The assembly formed by the ring 37 with the clevises 30 equipped with the trunnions 35 and the runners 38 is equivalent to a cardan joint sliding between and against the pillars 25, and allows, on the one hand, translations, parallel to the rotor axis Z—Z, of the plates 14 and 16 with the ring 37 and the clevises 30, guided by the pillars 25 so as to control variations in collective pitch, and, on the other hand, tilting of the plates 14 and 16 in any direction around the axis Z—Z to control variations in cyclic pitch, by pivoting the plates 14 and 16 in relation to the ring 37 and to the clevises 30 around the axis X—X of the trunnions 35 and/or pivoting of the plates 14 and 16 with the ring 37 and the clevises 30 in relation to the pillars 25 around the axis Y—Y, being activated by control actuators 23 controlling the non-rotating plate 16.

It can be understood that, during a variation in collective pitch, the runners 38 slide on the two pillars 25 by moving with the ring 37 parallel to the pillars 25, and without rotating around the axis Y—Y. On the other hand, during a variation in cyclic pitch with rotation around the axis Y—Y, the two runners 38 slide along the pillars 25 tilting simultaneously in relation to them, with the ring 37. It can be understood that the sliding fit of the two flanges 25a of each pillar 25 of "U" shaped cross section between the two sides 31 of the corresponding clevis 30 prevents any rotation of the clevises 30 and of the ring 37 in relation to the pillars 25 around the axis X—X.

It can also be understood that this assembly of the fixed pillars 25 in the clevises 30 of the ring 37 prevents the rotation of the ring 37 and of the clevises 30 around the rotor axis Z—Z, with the result that the non-rotating plate 16 is in fact restrained against any rotation around this axis Z—Z by the fixed pillars 25, the ring 37, the clevises 30, and the trunnions 35.

It can further be understood that each pillar 25 passes through the central passage 34 of the corresponding clevis 30 with sufficient radial play to allow the relative pivoting of the corresponding runner 38 and of this pillar 25, during rotation of the runner 38 around the axis Y—Y. FIG. 3 shows, sectionally through the middle of a runner 38 which has slid and pivoted on a pillar 25, an intermediate position between this pillar 25 and the corresponding clevis 30, between the position of FIG. 2, corresponding to zero collective and cyclic pitch, and extreme positions (shown in dotted lines in FIG. 1) in which one of the runners 38 has slid to the maximum towards the corresponding upper tab 26, and the other runner 38 towards the corresponding lower runner 27, and, conversely, for maximum cyclic pitches added respectively to maximum positive and maximum negative collective pitches.

To rotate the rotating plate 14 around the axis Z—Z, the plate 14 is also articulated, on its periphery and between the clevises 17, on two rotating components 40 (only one of which is shown in FIG. 1), connecting the rotating plate 14 to the shaft 2 of the rotor. This rotating component may be a rotating torque link 40 of conventional structure, with two arms 40a and 40b articulated pivoting onto each other, and one 40a by a ball joint 41 on the rotating plate 14, and the other 40b pivoting in a clevis 42 of a torque link driver constituted, in this example, by the ring 11 fixed to the flange ring 12 of the shaft 2.

Figure 4:
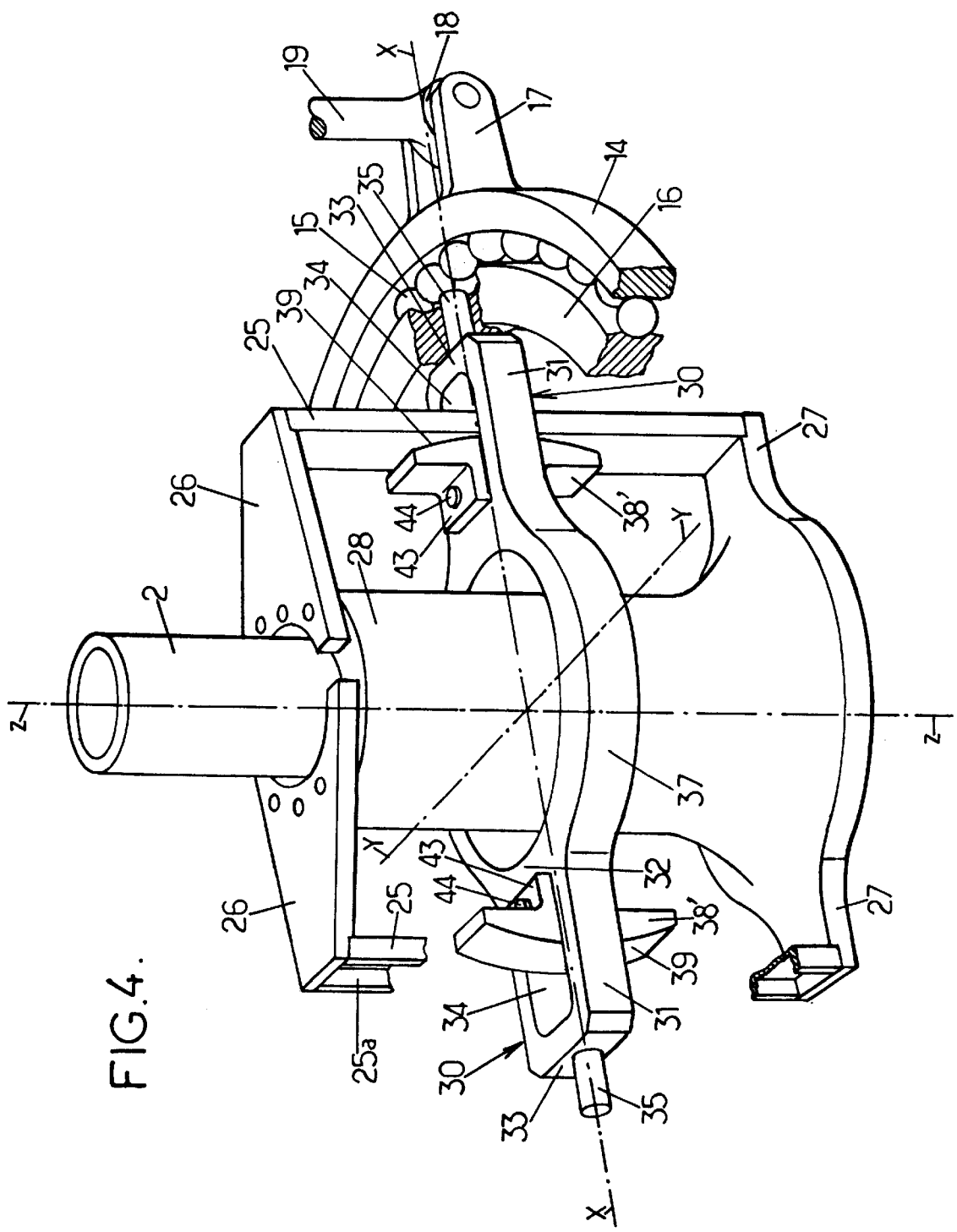
FIG. 4 is a perspective view of a variant of a second example of a pitch control device in accordance with the invention.

FIG. 4 shows partially, diagrammatically and in perspective, a first variant of a device with swash-plates, non-rotating pillars and cylindrical runners, which can essentially only be distinguished from the example in FIGS. 1 to 3 by the structure and the assembly of the runners on the ring and the clevises, with the result that the same numerical references are used in FIG. 4 to denote the corresponding elements.

In FIG. 4, each runner 38' comprises two parallel tabs 43, projecting radially inwards (towards the axis Z—Z), with the result that the runner 38' is added on the ring 37 and its clevises 30 being mounted as a U-bolt overlapping, by its tabs 43, the corresponding clevis bottom 32, on which the runner 38' is fixed by screws such as 44 traversing the tabs 43.

For the rest, the structure and operation of this device are identical to what has been described for the previous example, by reference to FIGS. 1 to 3, each runner 38' having a cylindrical external face 39 of Y—Y axis by which the runner 38' remains permanently tangentially engaged and sliding against the internal face of the corresponding pillar 25.

The pitch control device in FIGS. 5 and 6 is a second device variant with added runners, and the rotor and this device in FIGS. 5 and 6 are of generally similar structure to that of the rotor and the device in FIGS. 1 to 3, with the result that again similar elements are indicated by the same numerical references, and only the special features of the version in FIGS. 5 and 6 are described below.

As in FIG. 4, each of the two runners 38" is added to the corresponding clevis 30, and, to this end, each runner 38" comprises a central fixing tab 45, in the shape of a cylindrical rod, which projects radially inwards and passes through the corresponding clevis bottom 32, with the result that a nut 46 is screwed, inside the ring 37, on the threaded end of this central tab 45. Each runner 38" is thus fixed by screwing, by its substantially plane internal face, against the external radial face, also plane, of the corresponding clevis bottom 32.

Moreover, each runner 38" has, on the sides of its cylindrical external face 39, two sides 47 which are parallel, substantially radial and pointing outwards in relation to the cylindrical face 39, with the result that each runner 38" has a substantially "U" shaped cross section open radially outwards. These two sides 47 of the runner 38" are placed between and against the sides 31 of the corresponding clevis 30, whereas the flanges 25*a* of the corresponding pillar 25, of "U" shaped cross section, are received with sliding fit between the two sides 47 of the runner 38". The latter is thus guided along the pillar 25, with no possibility of rotation around the axis X—X of the trunnions 35, by sliding of its cylindrical face 39 on the pillar 25 with possibility of pivoting around the axis Y—Y, and the support of the sides 47 of the runner 38" between the sides 31 of the clevis 30 improves the overall engagement of these elements in their moving along the pillar 25 and prevents any relative rotation around the axis X—X between the runner 38" and the corresponding clevis 30 of the ring 37.

Another difference between the embodiment in FIGS. 5 and 6 and the one in FIGS. 1 to 3 concerns the rotation drive means of the rotating plate 14' of the swash-plate assembly 13', the non-rotating plate 16 of which is identical to the one in the previous examples.

Indeed, in order further to reduce the axial space requirement of the device, it is possible, as shown in FIGS. 5, 7 and 8, to replace the torque link or links such as 40 by a rotating plate driver such as that described in U.S. application Ser. No. 09/157,817 filed Sep. 21, 1998, and the effects of which combine to advantage with those of the means characteristic of the invention and described above, to restrain the non-rotating plate 16 from rotating around the rotor axis Z—Z.

It will be recalled that, in accordance with U.S. application Ser. No. 09/157,817 filed Sep. 21, 1998 to which reference will be made for more details, and the content of which is incorporated in the present application by way of reference, driving the rotating plate 14' to rotate with the rotor is ensured by a driver 50. In FIGS. 5, 7 and 8, the driver 50 includes two rigid arms 51, diametrically opposite in relation to the rotor axis Z—Z and fixed under a flange ring 48 by which a tubular and central base 1*c* of the hub 1 is fixed by a ring of bolts 49 to an upper flange ring 2*a* of the rotor shaft 2, in this example. The driver 50 is thus rotating integrally with the shaft 2, above the swash-plate assembly 13'. Each arm 51 includes a part 51*a* substantially radial in relation to the axis Z—Z and prolonged by an axial part 51*b* parallel to the axis Z—Z over the major part of its axial length, and slightly curved towards the axis Z—Z at its lower end and at its upper end connecting to the radial part 51*a*. The axial arm part 51*b* has a "U" shaped cross section delimiting a groove open radially towards the rotor axis Z—Z. The internal faces of the two flanges 52 of the "U" shaped groove in each axial arm part 51*b* thus form a rigid rotation drive track of one of two drive pins 53 respectively integral with the rotating plate 14' and diametrically opposite on the latter, each pin 53 projecting radially outwards from the rotating plate 14' and engaged between the two flanges 52 of the "U" shaped groove of one of the axial arm parts 51*b* respectively.

In this variant, in which the rotation of a pin 53 is carried out with a contact force F applying alternately to one or other of the two flanges 52 (see FIG. 7) of the "U" shaped groove, each pin 53 includes a runner 54 sliding alternately against one or other of the two flanges 52 of the axial part 51*b* of the corresponding rigid arm 51 of the driver 50. To facilitate load transfer between the flanges 52 and the runner 54, by reducing friction, the internal face of the flanges 52 may have a carbide coating on its zone corresponding to the trajectory of the runner 54, the external face zones of which, engaging with the flanges 52, may also have carbide coatings. Each runner 54 has the general external shape of a relatively flat rectangle parallelepiped, punched with a cylindrical central aperture of circular section. Through this aperture, each runner 54 may be articulated, rotating around a first diametrical axis x—x of the rotating plate 14', in relation to this rotating plate 14', to which the runner 54 is connected by a pin-support arm 55 radial in relation to the center of the rotating plate 14' and of one piece with the latter, made for example of aluminum, while the driver 50 and its arms 51 are made for example of steel. In the particular position of the rotating plate 14' in FIG. 5, the axes x—x and X—X are merged, but the axis x—x is a rotating axis, whereas the axis X—X is a non-rotating axis around the rotor axis Z—Z. Each runner 54 thus has two opposite lateral faces 56 which are plane and parallel to each other and to the flanges 52 of the "U" shaped groove in which the runner 54 slides, and by its central aperture each runner 54 is rotary and sliding mounted around a runner fastening hub 57 on the external radial end of the pin-support arm 55. To this end, anti-friction shoulder rings 58 are mounted in the central aperture of the runner 54, and around an anti-friction ring 59 housed in the bottom of a "U" shaped groove delimited by an annular rim 60 at the periphery of the hub 57, which is centered by its rim 60 around the cylindrical external radial end of the pin-support arm 55 and kept against this end by the head of a screw 61 with a shank traversing the central part of the hub 57 and screwed into this end of the arm 55

In this variant, the substantially radial part 51*a* of each driver arm 51 can have a "U" shaped structure open downwards, i.e. towards the swash-plate assembly 13', or a box-type structure so as to offer greater rigidity.

In operation, the trajectory and the behavior of the runners 54 are as follows: for cyclic pitch, the two runners 54 slide in the "U" shaped grooves of the axial arm parts 51*b* of the driver 50 following an alternate circular trajectory portion (sinusoidal movement) around a second diametrical axis y—y (perpendicular to x—x) of the rotating plate 14'. [Just as for the axes X—X and x—x, Y—Y and y—y are merged in the particular position of the rotating plate 14' in FIG. 5, but y—y is a rotating axis whereas Y—Y is non-rotating around Z—Z]. In the case of variation in collective pitch, the two runners 54 slide in the "U" shaped grooves between the flanges 52 following a rectilinear trajectory, parallel to the rotor axis Z—Z, upwards (towards the hub 1) or downwards (towards the structure and the conical housing 24) in accordance with the collective pitch required.

During these movements, the rotating plate 14' may follow the tilting movements of the non-rotating plate 16 with no risk of the runners 54 jamming in the slides 51*b* thanks to the rotation of the rotating plate 14' around the axis x—x in relation to the runners 54.

As a variant, as described in FR 97 12126, each pin 53 may include one of two coaxial rollers respectively each rolling in one of the "U" shaped grooves respectively, against one at least of the flanges 52 of the "U" shaped groove delimiting the corresponding drive track, and around the common axis of the rollers, which is the diametrical axis x—x of the rotating plate 14', in order to eliminate all risk of sliding during collective pitch change (trajectory parallel to the rotor axis Z—Z), each roller is preferably a ball joint roller, as shown on a larger scale in FIG. 4*a* of the aforementioned patent application.

The pitch control devices of the invention described above, enable main rotor mast-hub assemblies to be made with a smaller vertical or axial space requirement compared with known versions with non-rotating torque links for restraining the non-rotating plate and with a simpler and plainer structure, and therefore with more cost effective construction, assembly and maintenance compared with known versions with non-rotating pillars for rotation restraint and translation and tilting guidance of the non-rotating plate.

What is claimed is:

1. A device for controlling a pitch of blades of an aircraft rotor on which each blade is, firstly, rotated around an axis of rotation of a shaft of the rotor by means of a hub rotating integrally with the shaft, and, secondly, rotating integrally, around a longitudinal blade pitch change axis, with at least one pitch lever controlled by a corresponding pitch rod, connected to a plate rotating with the rotor and belonging to a swash-plate assembly in which the rotating plate is mounted to rotate on a non-rotating plate, restrained against any rotation around a rotor axis, the two plates being annular, centered on the rotor axis and surrounding said rotor axis, and being able to be translated parallel to the rotor axis and tilted in any direction around the rotor axis, being activated by control actuators connecting the non-rotating plate to a structure of the rotor aircraft, for the control of a collective pitch and a cyclic pitch respectively of the blades, the non-rotating plate being restrained from rotation by means of two pillars non-rotating around the rotor axis, which pillars are parallel to said rotor axis, diametrically opposite in relation to said rotor axis and connected to said structure, and which pillars guide the plates in translation along the rotor axis by means of two slides each movable along a respective pillar and belonging to an articulated connection which connects the non-rotating plate to the pillars and allows tilting of the plates in any direction around the rotor axis by pivoting the non-rotating plate around two diametrical axes of said non-rotating plate which diametrical axes are perpendicular to each other and one of which remains perpendicular to the rotor axis, each of the two slides cooperating with one of two trunnions respectively which are coaxial around a first of the two pivoting diametrical axes, wherein each of the slides is, firstly, mounted pivoting on the non-rotating plate by said trunnion swiveling in one of two radial, coaxial and diametrically opposite bores respectively, and, secondly, secured to one of two runners respectively said runners being diametrically opposite in relation to the center of the non-rotating plate on the rotor axis and each runner having an external face, in relation to the rotor axis, which is a cylindrical surface portion the axis of which is the second pivoting axis, perpendicular to the rotor axis, and so that the runners are permanently engaged sliding by their external surface with the pillars and between them, and tilt with the slides in relation to the pillars, by rotation around the second pivoting axis and translate with the slides along the pillars.

2. A device according to claim 1, wherein the two slides are integral with a same rigid ring non-rotating around the rotor axis and surrounding said rotor axis and on which ring the slides are diametrically opposite, with the result that the ring is pivoted around at least one of the first and the second pivoting axes and translated with the slides.

3. A device according to claim 2, wherein the two non-rotating pillars are fixed to the structure by means of fixing supports fixed to a tubular housing, fixed to said structure and surrounding a base of the rotor shaft, said housing being itself surrounded by the ring integral with the slides and runners.

4. A device according to claim 1, wherein at least one of two engaging elements that are the pillar and the slide has two substantially radial sides in relation to the rotor axis and between which the other element is restrained from rotation around said rotor axis, with play in the radial direction in relation to the rotor axis which is sufficient to enable sliding with rotation of the corresponding runner and of the slide against the corresponding pillar.

5. A device according to claim 4, wherein said other element is mounted with sliding fit between said sides so as to prevent any rotation of the slide around the first pivoting axis.

6. A device according to claim 4, wherein each slide includes a clevis with two sides substantially radial outwards from a clevis bottom with which the corresponding runner is integral, so that the cylindrical external face of the runner delimits the internal radial wall, in relation to the rotor axis, of a central clevis passage which is passed through by the corresponding pillar.

7. A device according to claim 1, wherein each runner is of one piece with the corresponding slide, and the cylindrical external face of said runner is manufactured on the slide.

8. A device according to claim 1, wherein each runner is added to the corresponding slide.

9. A device according to claim 8, wherein each runner includes at least one tab projecting radially inwards, in relation to the rotor axis and by which the runner is fixed, on a corresponding clevis bottom.

10. A device according to claim 6, wherein the central passage of each clevis is delimited radially outwards in relation to the rotor axis by an external wall of the slide and the corresponding trunnion is restrained projecting outwards on said external wall of the slide.

11. A device according to claim 10, wherein each trunnion is fixed on the external wall of the corresponding slide by a screw with a head restrained in the central passage and against said external wall, and with a shank having a threaded end screwed in a trunnion bore, and an intermediate and smooth shank part, traversing said external wall.

12. A device according to claim 6, wherein each runner has a "U" shaped cross section and has two outwardly substantially radial sides laterally on the runner cylindrical external face, and the corresponding pillar is engaged between said radial sides with a sliding fit, the sides of each runner being between and against the sides of the clevis of the corresponding slide.

13. A device according to claim 6, wherein each pillar has a "U" shaped cross section, open radially outwards, with two substantially radial flanges engaged with sliding fit between the two sides of at least one of the clevis and the corresponding runner.

14. A device according to claim 1, wherein the rotating plate is rotated by means of at least one rotating torque link, with at least two arms articulated on each other and one of which is articulated on the rotating plate and the other of which is articulated on one at least of the shaft and the hub of the rotor.

15. A device according to claim 1, wherein the rotating plate is rotated with the rotor by means of a driver including two rigid rotation drive tracks extending at least partly substantially axially, parallel to the rotor axis, diametrically opposite in relation to the rotor axis and rotating integrally with one at least of the two components namely the hub and the rotor shaft, each track engaging with one of two drive pins respectively, rotating integrally with the rotating plate and diametrically opposite on said rotating plate, one of the two engaging elements namely a track and a pin having two flanges between which the other element is engaged, so that each drive pin follows on the corresponding track a rectilinear trajectory, parallel to the rotor axis, in the case of variation in collective pitch, and a circular arc trajectory centered on the rotor axis, in the case of variation in cyclic pitch.

16. A device according to claim 15, wherein each drive track is delimited in a substantially axial groove of the driver, and the corresponding pin is engaged in the groove.

17. A device according to claim 16, wherein each groove is formed in a substantially axial part with a "U" shaped cross section of one of two rigid driver arms respectively, and the corresponding pin is engaged between the two flanges of the "U" shaped groove of said arm.

18. A device according to claim 17, wherein said "U" shaped groove is open radially towards the rotor axis, and each pin projects radially outwards from the rotating plate, radially in relation to the center of said rotating plate.

19. A device according to claim 17, wherein at least one of the pins includes at least one pin runner sliding against at least one of the two flanges of the "U" shaped groove delimiting the corresponding drive track.

20. A device according to claim 19, wherein said pin runner is articulated in relation to the rotating plate.

21. A device according to claim 20, wherein said pin runner has two opposite side faces substantially plane and parallel to the flanges of the "U" shaped groove in which the pin runner slides, and the pin runner is rotary and sliding mounted around a pin runner fastening hub which is fixed on the external radial end of a pin-support arm of the rotating plate.

22. A device according to claim 17, wherein at least one of the pins includes at least one pin roller rolling against at least one of the two flanges of the "U" shaped groove delimiting the corresponding drive track.

* * * * *